(12) United States Patent
Kim et al.

(10) Patent No.: US 9,554,233 B2
(45) Date of Patent: Jan. 24, 2017

(54) METHOD AND DEVICE FOR CONTROLLING MULTIPRIORITY IN WIRELESS COMMUNICATION SYSTEM

(71) Applicant: LG ELECTRONICS INC., Seoul (KR)

(72) Inventors: Jaehyun Kim, Anyang-si (KR); Laeyoung Kim, Anyang-si (KR); Taehyeon Kim, Anyang-si (KR); Hyunsook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/432,417

(22) PCT Filed: Oct. 4, 2013

(86) PCT No.: PCT/KR2013/008877
§ 371 (c)(1),
(2) Date: Mar. 30, 2015

(87) PCT Pub. No.: WO2014/054905
PCT Pub. Date: Apr. 10, 2014

(65) Prior Publication Data
US 2015/0256961 A1    Sep. 10, 2015

Related U.S. Application Data

(60) Provisional application No. 61/709,987, filed on Oct. 5, 2012.

(51) Int. Cl.
*H04W 4/00* (2009.01)
*H04W 74/08* (2009.01)
*H04W 76/02* (2009.01)

(52) U.S. Cl.
CPC ........... *H04W 4/005* (2013.01); *H04W 74/085* (2013.01); *H04W 76/027* (2013.01)

(58) Field of Classification Search
CPC ... H04W 4/005; H04W 76/027; H04W 74/085
See application file for complete search history.

(56) References Cited

U.S. PATENT DOCUMENTS

2011/0199905 A1* 8/2011 Pinheiro ............... H04W 4/005
370/235
2012/0082029 A1    4/2012 Liao
(Continued)

FOREIGN PATENT DOCUMENTS

| KR | 10-2012-0035896 A | 4/2012 |
| KR | 10-2012-0070523 A | 6/2012 |
| KR | 10-2012-0070530 A | 6/2012 |

OTHER PUBLICATIONS

Huawei et al., "EAB for network sharing", 3GPP SA WG2 Meeting #89, S2-120941, Feb. 6-10, 2012, Vancouver, Canada, 6 pages.
(Continued)

*Primary Examiner* — Andrew Lai
*Assistant Examiner* — Chuong M Nguyen
(74) *Attorney, Agent, or Firm* — Birch, Stewart, Kolasch & Birch, LLP

(57) ABSTRACT

The present invention relates to a wireless communication system and, more specifically, to a method and a device for controlling a backoff timer on the basis of multipriority in a wireless communication system. The method for controlling a backoff timer in a terminal in which multipriority is set, according to one embodiment of the present invention, comprises the steps of: transmitting, to a network node, a non access stratum (NAS) request message which is set to a first priority level and does not have an access point name (APN); receiving a reject message for the NAS request message from the network node; and starting a session (Continued)

management (SM) backoff timer on the basis of the rejection message, wherein while the SM backoff timer is operated, the terminal is permitted to transmit a new NAS request message which is not set to the first priority level.

10 Claims, 4 Drawing Sheets

(56) References Cited

U.S. PATENT DOCUMENTS

| | | | |
|---|---|---|---|
| 2012/0155257 A1 | 6/2012 | Tiwari | |
| 2012/0157033 A1 | 6/2012 | Ou et al. | |
| 2012/0170453 A1 | 7/2012 | Tiwari | |
| 2012/0257571 A1* | 10/2012 | Liao | H04W 4/005 370/328 |
| 2012/0281566 A1* | 11/2012 | Pelletier | H04W 76/046 370/252 |
| 2012/0294143 A1* | 11/2012 | Niemi | H04W 36/0022 370/230 |
| 2013/0203399 A1* | 8/2013 | Gupta | H04W 28/12 455/418 |
| 2013/0308527 A1* | 11/2013 | Chin | H04W 76/06 370/328 |

OTHER PUBLICATIONS

Vaidya et al., "Network Congestion Control: Mechanisms for Congestion Avoidance and Recovery", Proceedings of the 1st International Conference on Wireless Technologies for Humanitariam Relief (ACWR 2011), Dec. 18-21, 2011, pp. 199-207.

Huawei et al., "MS supporting dual priority," SA WG2 Meeting #93, S2-123630, Sofia, Bulgaria, Oct. 8-12, 2012, 10 pgs.

Huawei et al., "UE supporting dual proirity," SA WG2 Meeting #93, S2-123629, Sofia, Bulgaria, Oct. 8-12, 2012, 10 pgs.

* cited by examiner

METHOD AND DEVICE FOR CONTROLLING MULTIPRIORITY IN WIRELESS COMMUNICATION SYSTEM

CROSS REFERENCE TO RELATED APPLICATIONS

This application is the National Phase of PCT International Application No. PCT/KR2013/008877, filed on Oct. 4, 2013, which claims priority under 35 U.S.C. 119(e) to U.S. Provisional Application No. 61/709,987, filed on Oct. 5, 2012, all of which are hereby expressly incorporated by reference into the present application.

TECHNICAL FIELD

The present invention relates to a wireless communication system, and more particularly, to a control method and device based on multiple priorities in a wireless communication system.

BACKGROUND ART

Machine type communication (MTC) refers to a communication scheme between one or more machines and is also referred to as machine-to-machine (M2M) communication. Here, a machine refers to an entity which does not require direct human operation or intervention. For example, a device including a mobile communication module, such as a meter or a vending machine, may include a user equipment such as a smartphone which is capable of automatically accessing a network without operation/intervention of a user to perform communication. Various examples of such a machine are referred to as an MTC device or terminal in the present specification. That is, MTC refers to communication performed by one or more machines (that is, MTC devices) without human operation/intervention.

MTC may include communication (e.g., device-to-device (D2D) communication) between MTC devices and communication between an MTC device and an MTC application server. Examples of communication between an MTC device and an MTC application server include communication between a vending machine and a server, communication between a point of sale (POS) device and a server and an electric meter, and communication between a gas meter or a water meter and a server. AN MTC-based application may include security, transportation, healthcare, etc.

Meanwhile, if congestion or overload occurs in a network, congestion control may be performed in a control plane. For example, network congestion control may be performed at a non-access stratum (NAS) level which is an uppermost stratum in a control plane between a terminal and a network control node in a radio interface. In general, if a network congestion occurs, a network may configure a back-off timer for inhibiting a request for a network for a predetermined time with respect to a terminal.

According to operation of a currently defined wireless communication system, priority may be configured per terminals, and only one of "(NAS signaling) low priority" for a terminal supporting MTC or "(NAS signaling) non-low priority" for a terminal supporting non-MTC.

Meanwhile, if network congestion or overload occurs, a back-off timer (BOT) may be used in order to distribute network load. Back-off timers may be classified into a Mobility Management (MM) back-off timer and a Session Management (SM) back-off timer. MM back-off timer defines a time in which a terminal is prohibited from performing MM-related operations such as an attach request, SM back-off timer defines a time in which a terminal is prohibited from performing SM-related operations such as a session establishment/modify request related to an Access Point Name (APN).

DISCLOSURE OF THE INVENTION

Technical Task

An object of the present invention devised to solve the problem lies in a new method for, at a UE configured for multipriority, performing operation based on an SM backoff timer and priority when the SM backoff timer without an APN is running.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

The object of the present invention can be achieved by providing a method of controlling a backoff timer at a user equipment (UE) configured for multipriority including transmitting a non access stratum (NAS) request message without an access point name (APN), which is set to a first priority level, to a network node, receiving a reject message for the NAS request message from the network node, and initiating a session management (SM) backoff timer based on the reject message, wherein a new NAS request message, which is not set to the first priority level, is permitted to be transmitted by the UE while the SM backoff timer is running.

In another aspect of the present invention, provided herein is a user equipment (UE) device for controlling a backoff timer if multipriority is set including a transceiver module, and a processor, wherein the processor configured to transmit a non access stratum (NAS) request message without an access point name (APN), which is set to a first priority level, to a network node using the transceiver module, to receive a reject message for the NAS request message from the network node using the transceiver module, and to initiate a session management (SM) backoff timer based on the reject message, and wherein a new NAS request message, which is not set to the first priority level, is permitted to be transmitted by the UE while the SM backoff timer is running.

The embodiments of the present invention have the following features.

A new NAS request message, which is set to the first priority level, may not be permitted to be transmitted by the UE while the SM backoff timer is running.

The UE may not provide the APN during a procedure initiated by transmitting the NAS request message.

The procedure initiated by transmitting the NAS request message may be an attach procedure.

The NAS request message without the APN may be an attach request message without an APN.

The NAS request message without the APN may be an attach request message transmitted along with a packet data network (PDN) connectivity request without an APN.

The reject message may include a value for the SM backoff timer.

The reject message may be received due to insufficient resources.

The UE configured for multipriority may be a UE configured for dual priority.

The first priority level may correspond to the UE being configured for NAS signaling low priority.

The first priority level may correspond to a low priority indicator, which is set to the UE being configured for NAS signaling low priority.

The UE may be a machine type communication (MTC) device.

It is to be understood that both the foregoing general description and the following detailed description of the present invention are exemplary and explanatory and are intended to provide further explanation of the invention as claimed.

Advantageous Effects

According to the present invention, it is possible to provide a new method for, at a UE configured for multipriority, performing operation based on an SM backoff timer and priority when the SM backoff timer without an APN is running.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Mode for Invention

Figure 1:
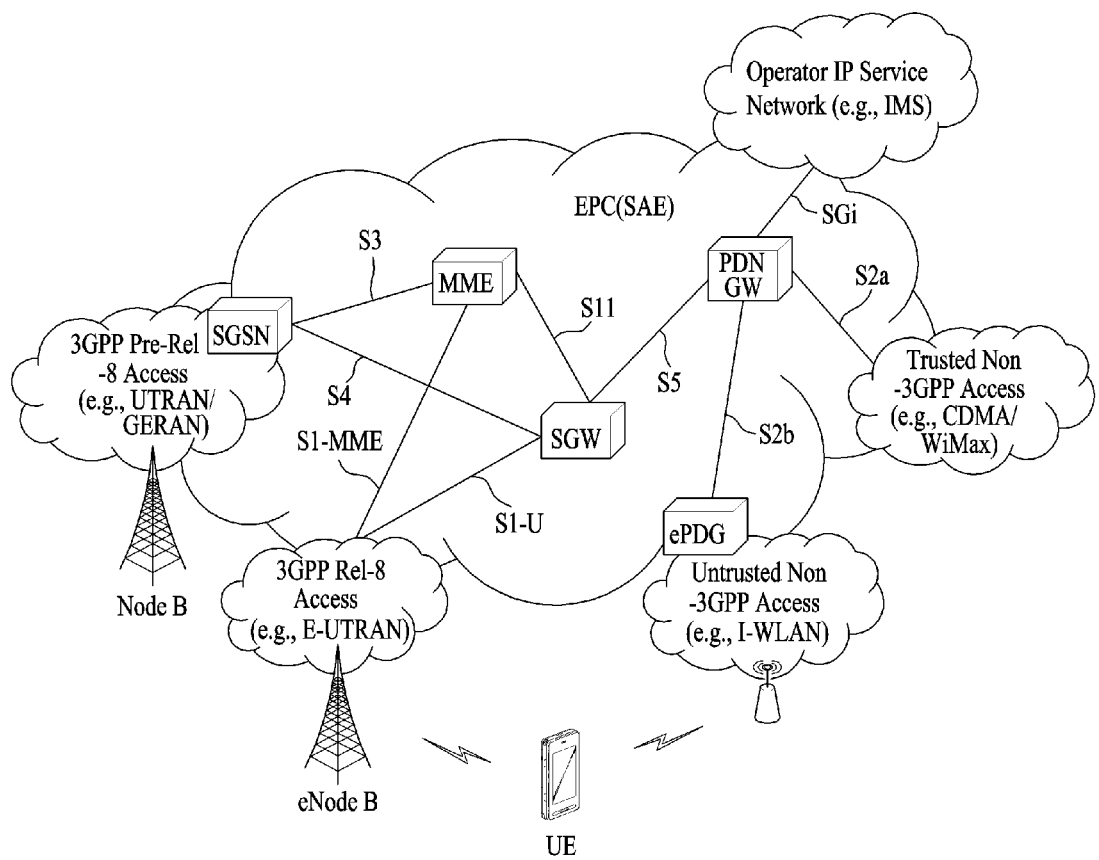
FIG. 1 is a diagram showing the schematic architecture of an evolved packet core (EPC)

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to others. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by the standard documents disclosed in any one of wireless access systems, such as an IEEE 802 system, a $3^{rd}$ Generation Partnership Project (3GPP) system, a 3GPP Long Term Evolution (LTE) and LTE-A system, and a 3GPP2 system. That is, the steps or portions, which are not described in order to make the technical spirit of the present invention clear, may be supported by the above documents. In addition, all the terms disclosed in the present document may be described by the above standard documents.

The following technologies may be used in various wireless communication systems. For clarity, 3GPP LTE and 3GPP LTE-A will be focused upon in the following description, but the scope of the present invention is not limited thereto.

Terms used in the present specification are as follows.

UMTS (universal mobile telecommunication system): Third generation mobile communication technology based on global system for mobile communication (GSM) developed by 3GPP.

EPS (evolved packet system): Network system including an evolved packet core (EPC) which is a packet switched (PS) core network based on internet protocol (IP) and an access network such as LTE/UTRAN, which is evolved from UMTS.

NodeB: Base station of GERAN/UTRAN, which is mounted outdoors and coverage of which forms a macro cell.

eNodeB: Base station of E-UTRAN, which is mounted outdoors and coverage of which forms a macro cell.

UE: User equipment. The UE may be referred to as a terminal, a mobile equipment (ME), a mobile station (MS), etc. In addition, the UE may be a portable apparatus such as a laptop, a mobile phone, a personal digital assistant (PDA), a smartphone and a multimedia apparatus or a non-portable apparatus such as a vehicle mounted apparatus. A UE or terminal may indicate an MTC device in MTC.

Home NodeB (HNB): Base station of a UMTS network, which is mounted indoors and coverage of which forms a micro cell.

Home eNodeB (HeNB): Base station of an EPS network, which is mounted indoors and coverage of which forms a micro cell.

MME (mobility management entity): Network node of an EPS network, which performs a mobility management (MM) function and a session management (SM) function.

PDN-GW (packet data network-gateway)/PGW: Network node of an EPS network, which performs a UE IP address allocation function, a packet screening and filtering function and a charging data collection function.

SGW (serving gateway): Network node of an EPS network, which performs mobility anchor, packet routing, idle mode packet buffering, triggering for enabling an MME to page a UE.

PCRF (policy and charging rule function): Network node of an EPS network, which performs policy decision for dynamically applying quality of service (QoS) and charging policy differentiated per service flow.

OMA DM (open mobile alliance device management): Protocol designed for management of mobile devices such as a mobile phone, a PDA or a portable computer, which performs functions such as device configuration, firmware upgrade, error report, etc.

OAM (operation administration and maintenance): OAM is a set of network administration functions for providing network fault display, performance information, data and diagnostic functions.

NAS (non-access stratum): Upper stratum of a control plane between a UE and an MME. This is a functional layer for signaling between a UE and a core network and exchanging a traffic message in an LTE/UMTS protocol stack, supports UE mobility, and supports a session management procedure for establishing and maintaining an IP connection between a UE and a PDN GW.

NAS configuration MO (NAS configuration management object): MO used to configure parameters associated with NAS functionality with respect to a UE.

SIPTO (selected IP traffic offload): Scheme for transmitting specific IP traffic through a public network such as the Internet instead of an operator network when transmitting the specific IP traffic through an H(e)NB or a macro cell. In a 3GPP release-10 system, an operator selects a PDN-GW which is physically close to a UE in an EPC network and supports handover of user traffic.

PDN (packet data network): Network in which a server supporting a specific service (e.g., a multimedia messaging service (MMS) server, a wireless application protocol (WAP) server, etc.) is located.

PDN connection: Logical connection between a UE and a PDN, which is expressed by one IP address (one IPv4 address and/or one IPv6 prefix).

APN (Access Point Name): String indicating or identifying a PDN. A requested service or a network (PDN) is accessed through a PGW and the APN is the name (string) previously defined in the network in order to find the PGW. For example, the APN may be expressed by internet.mnc012.mcc345.gprs.

IMS (IP multimedia subsystem): Subsystem for providing a multimedia service based on IP.

MTC (machine type communications): Communication performed by a machine without human intervention.

MTC device: UE (e.g., a vending machine, a meter, etc.) which has a communication function through a core network and serves a specific purpose.

MTC-IWF (MTC interworking function): Entity serving as a gateway for transmitting a control signal or data for MTC through a 3GPP network including EPS or IMS.

SCS (service capability server): Server connected to a 3GPP network for communication with an MTC device using an MTC-IWF and an MTC device located in a home public land mobile network (HPLMN). The SCS provides capability for utilizing one or a plurality of applications.

MTC server: Server on a network for managing an MTC terminal, which may be located inside or outside a mobile communication network and may have an interface accessible by an MTC user. The MTC server may provide an MTC associated service to other servers (an SCS) and may be an MTC application server.

MTC application: Service to which MTC is applied (e.g., remote metering, product movement tracking, etc.).

MTC application server: Server on a network in which an MTC application is executed.

MTC feature: Function of a network supporting an MTC application. For example, MTC monitoring is a feature for preparing for equipment loss in an MTC application such as remote metering and low mobility is a feature for an MTC application for an MTC device such as a vending machine.

MTC subscriber: Entity which is connected to a network operator and provides a service to one or more MTC terminals.

MTC group: Group of MTC terminals which share at least one MTC feature and belong to an MTC subscriber.

RAN (radio access network): Unit including a NodeB, an eNodeB and a radio network controller for controlling the NodeB and the eNodeB in a 3GPP network, which is present between UEs and provides connection to a core network.

HLR (home location register)/HSS (home subscriber server): Database having subscriber information in a 3GPP network. The HSS may perform functions such as configuration storage, identity management and user state storage.

PLMN (public land mobile network): Network configured for the purpose of providing a mobile communication service to individuals. This network may be configured on a per operator basis.

NAS level congestion control: Congestion or overload control function of an EPS network composed of APN based congestion control and general NAS level mobility management control.

MM back-off timer (mobility management back-off timer): Mobility management back-off timer used to control congestion when congestion occurs in a network. While the MM back-off timer runs, a UE is set so as not to perform attach, location information update (e.g., tracking area update (TAU)), routing area update (RAU), service request/extended service request, etc. (in case of an emergency bearer service, a paging response in an existing region, or a multimedia priority service (MPS), even when the MM back-off timer runs, the UE is set to make a request).

SM back-off timer (session management back-off timer): Session control back-off timer used to control congestion when congestion occurs in a network. While the SM back-off timer runs, a UE is set so as not to perform establishment or change of a session based on an associated APN, etc. (in case of an emergency bearer service or an MPS, even when the SM back-off timer runs, the UE is set to make a request).

TA (tracking area): Registration area of a terminal in an EPS network. The TA is identified by a tracking area identity (TAI).

RA (routing area): Registration area of a terminal for a packet core network domain in a GPRS/UMTS network. The RA is identified by a routing area identity (RAI).

Hereinafter, a description will be given based on the above-described terms.

FIG. 1 is a diagram showing the schematic architecture of an evolved packet core (EPC).

The EPC is a fundamental element of system architecture evolution (SAE) for improving 3GPP performance. SAE corresponds to a research project for deciding a network structure supporting mobility between various types of networks. SAE aims to provide an optimized packet-based system which supports various radio access technologies based on IP and provides improved data transfer capabilities.

More specifically, the EPC is a core network of an IP mobile communication system for a 3GPP LTE system and may support a packet-based real-time and non-real-time service. In the existing mobile communication system (that is, a second or third generation mobile communication system), a core network function was implemented through two distinct sub-domains of a voice network (a circuit-switched (CS) network) and a data network (a packet-switched (PS) network). In a 3GPP LTE system which is evolved from the third generation communication system, sub-domains of a CS network and a PS network were unified into one IP domain. That is, in a 3GPP LTE system, a terminal having IP capability and a terminal may be connected through an IP based base station (e.g., an eNodeB (evolved Node B)), an EPC, an application domain (e.g., an IMS)). That is, the EPC is a structure necessary to implement an end-to-end IP service.

The EPC may include various components. FIG. 1 shows a serving gateway (SGW), a packet data network gateway (PDN GW), a mobility management entity (MME), a serving GPRS (general packet radio service) (SGSN) supporting node and an enhanced packet data gateway (ePDG).

The SGW operates as a boundary point between a radio access network (RAN) and a core network and is an element which performs a function for maintaining a data path between an eNodeB and a PDG GW. In addition, if a terminal moves over a region served by an eNodeB, the SGW serves as a local mobility anchor point. That is, packets may be routed through the SGW for mobility in an evolved UMTS terrestrial radio access network (E-UTRAN) defined after 3GPP release-8. In addition, the SGW may serve as an anchor point for mobility of another 3GPP network (an RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an untrusted network such as an interworking wireless local area network (I-WLAN) and a trusted network such as a code division multiple access (CDMA) or WiMAX network).

Although the SGW and the PDN GW are configured as separate gateways in the example of the network structure of FIG. 1, the two gateways may be implemented according to a single gateway configuration option.

The MME performs signaling and control functions in order to support access to network connection of a UE, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., GPRS networks).

The ePDG serves as a security node for a non-3GPP network (e.g., an I-WLAN, a Wi-Fi hotspot, etc.).

As described with reference to FIG. 1, a terminal having IP capabilities may access an IP service network (e.g., an IMS) provided by an operator through various elements in the EPC based on 3GPP access or non-3GPP access.

FIG. 1 shows various reference points (e.g., S1-U, S1-MME, etc.). In the 3GPP system, a conceptual link connecting two functions present in different functional entities of an E-UTRAN and an EPC is defined as a reference point. Table 1 shows the reference points shown in FIG. 1. In addition to the example of Table 1, various reference points may be present according to network structure.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | Reference point between MME and SGSN. Enables user and bearer information exchange for inter 3GPP access network mobility in idle and/or active state. This reference point can be used intra-PLMN or inter-PLMN (e.g. in the case of Inter-PLMN HO). |
| S4 | Reference between SGW and SGSN. Provides related control and mobility support between GPRS Core and the 3GPP Anchor function of Serving GW. In addition, if Direct Tunnel is not established, it provides user plane tunneling. |
| S5 | Reference point for providing user plane tunneling and tunnel management between Serving GW and PDN GW. Used for Serving GW relocation due to UE mobility and if the Serving GW needs to connect to a non-co-located PDN GW for the required PDN connectivity. |
| S11 | Reference point between MME and SGW |
| SGi | Reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to a non-3GPP interface. S2a is a reference point for providing associated control between the trusted non-3GPP access and the PDNGW and mobility support to a user plane. S2b is a reference point for providing associated control between the ePDG and the PDNGW and mobility support to a user plane.

Figure 2:
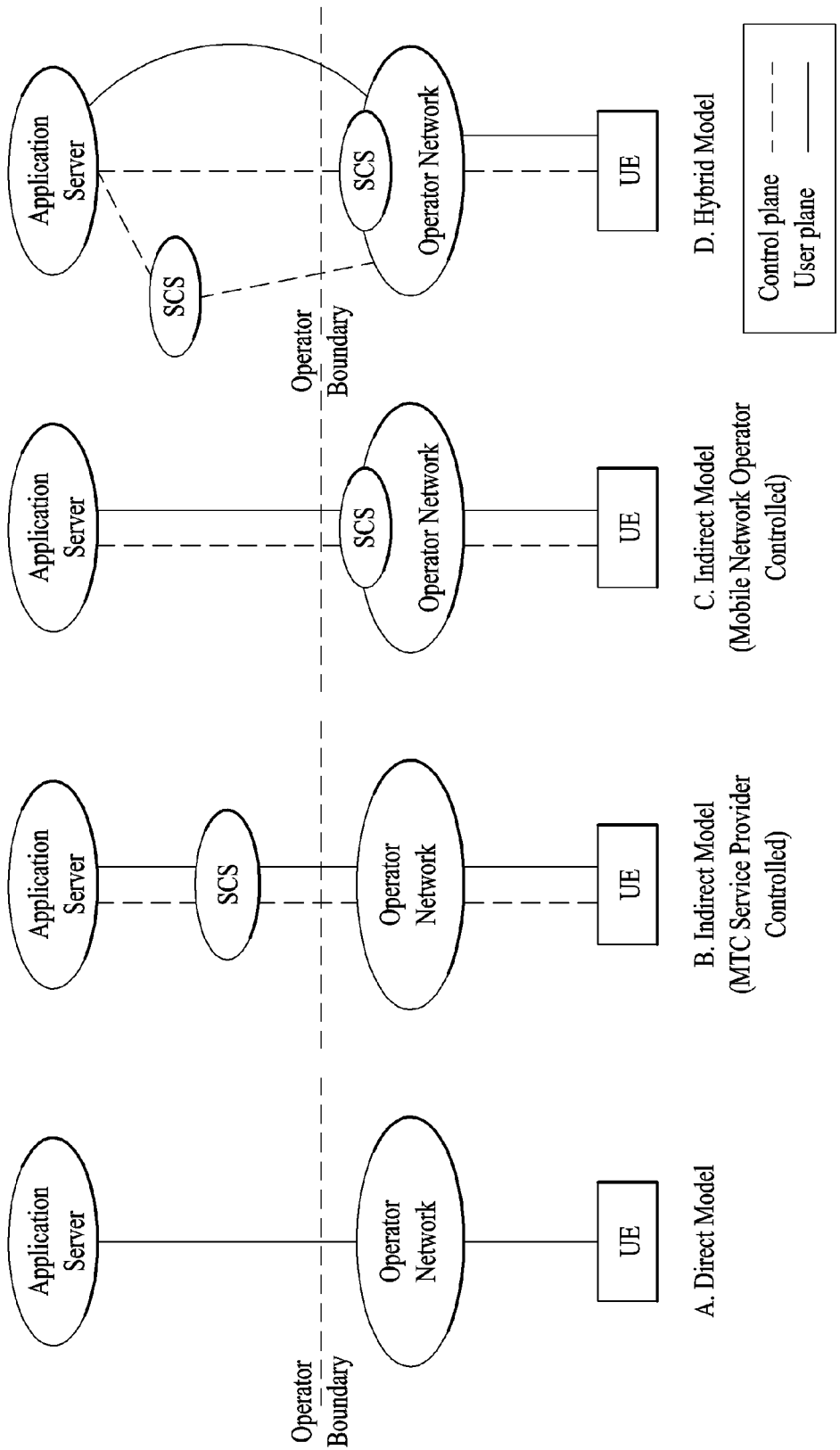
FIG. 2 is a diagram showing examples of an MTC communication model.

FIG. 2 is a diagram showing examples of an MTC communication model.

Although communication through a PS network is defined in association with MTC in 3GPP GSM/UMTS/EPS, the present invention is not limited to MTC through the PS network and is applicable to MTC through the CS network. In the current technical standard, a network structure is defined using the existing bearer of a 3GPP system. Here, a method of using a short message service (SMS) for data exchange between an MTC device and an MTC server is proposed. Since a small amount of digital data such as metering information or product information is exchanged due to the characteristics of an MTC application, an SMS is most preferably used and a conventional SMS method and an IMS based method may be supported. Methods of controlling a paging range for an MTC application with low mobility have been proposed.

The MTC application is executed in each of an MTC device and an MTC server (e.g., an SCS) to interwork through communication using a network. At this time, various models of MTC traffic may be implemented depending on what participates in communication between an MTC application and a 3GPP network. FIG. 2(a) shows a model in which communication is directly performed without an MTC server (e.g., an SCS), FIG. 2(b) shows a model in which an MTC server (e.g., an SCS) is located outside an operator domain, and FIG. 2(c) shows a model in which an MTC server (e.g., an SCS) is located inside an operator domain. In addition, FIG. 2(a) corresponds to a direct communication scheme controlled by a 3GPP operator, FIG. 2(b) corresponds to a communication scheme controlled by a service provider, and FIG. 2(c) corresponds to a communication scheme controlled by a 3GPP operator.

The direct model of FIG. 2(a) shows that an MTC application directly performs communication with a UE (or an MTC device) with respect to a 3GPP network as an over-the-top (OTT) application.

The indirect model of FIGS. 2(b) and 2(c) shows that an MTC application indirectly performs communication with a UE (or an MTC device) using a supplementary service provided by a 3GPP network. More specifically, in the example of FIG. 2(b), the MTC application may use an MTC server (e.g., an SCS) for supplementary services provided by a third-party (that is, for which 3GPP is not responsible) service provider. The MTC server (e.g., the SCS) may perform communication with a 3GPP network through various interfaces. In the example of FIG. 2(c), the MTC application may use an MTC server (e.g., an SCS) for supplementary services provided by a 3GPP operator (which corresponds to a service provider). Communication between an MTC server (e.g., an SCS) and a 3GPP network is performed within a PLMN. In FIGS. 2(b) and 2(c), an interface between an MTC server (e.g., an SCS) and an MTC application is not included in the 3GPP standard.

Since the indirect models of FIGS. 2(a) and 2(b) are complementary, a 3GPP operator may combine the indirect models for a different application. That is, as shown in FIG. 2(d), an MTC communication module may be implemented as a hybrid model in which a direct model and an indirect model are simultaneously used. In case of the hybrid model, the MTC device may perform communication with a plurality of MTC servers (e.g., SCSs) in an HPLMN and an MTC server (e.g., an SCS) controlled by a service provider and an MTC server (e.g., an SCS) controlled by a 3GPP operator may be different in terms of capabilities provided to an MTC application.

Figure 3:
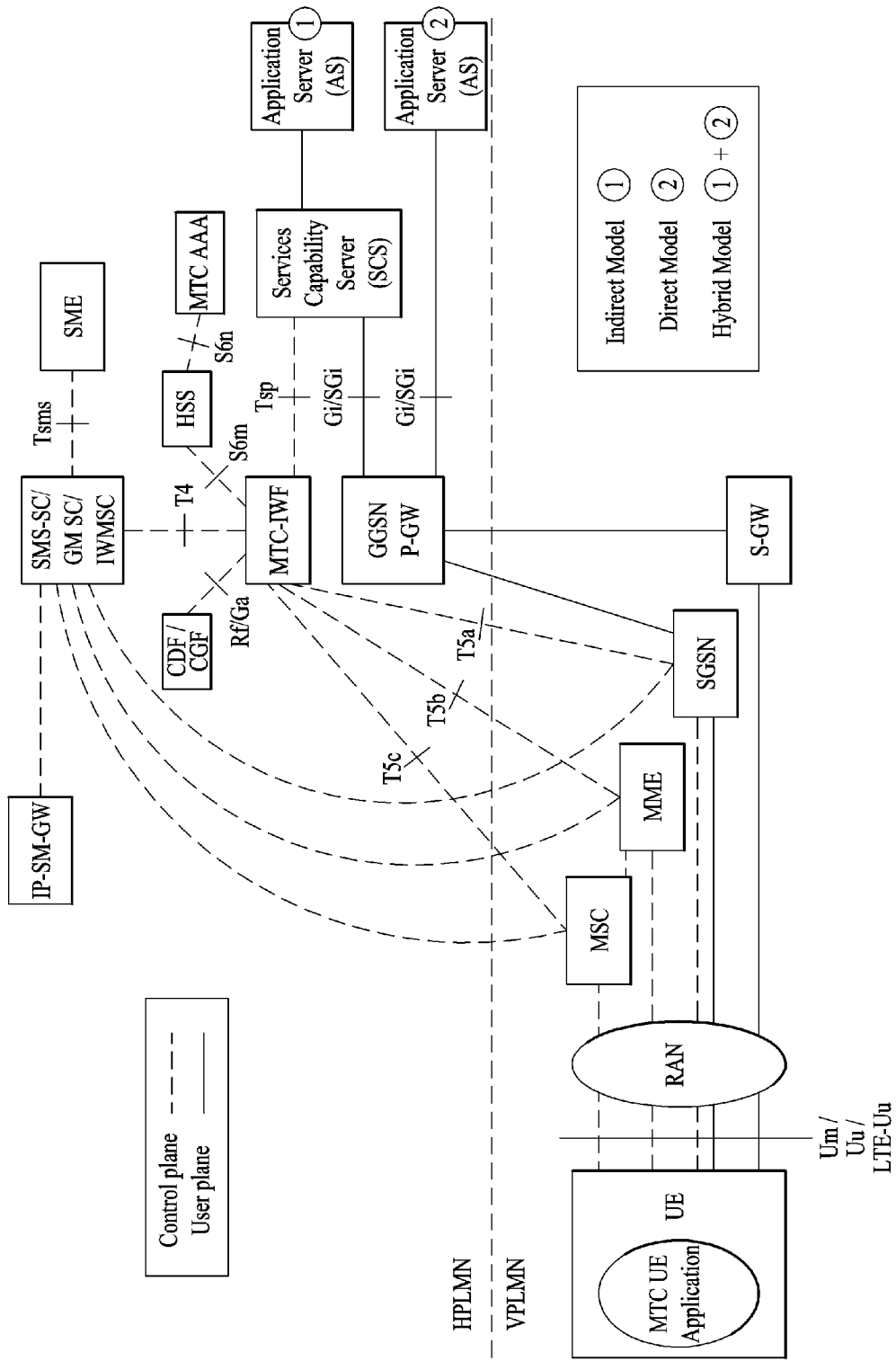
FIG. 3 is a diagram showing an exemplary model of an MTC architecture.

FIG. 3 is a diagram showing an exemplary model of an MTC architecture.

An end-to-end application between a UE (or an MTC device) used for MTC and an MTC application may use services provided by a 3GPP system and selective services provided by an MTC server (e.g., an SCS). A 3GPP system may provide transport and communication services (including a 3GPP bearer service, and IMS and an SMS) including a variety of optimization services facilitating MTC. In FIG. 3, a UE used for MTC is connected to a 3GPP network (UTRAN, E-UTRAN, GERAN, I-WLAN, etc.) through a Um/Uu/LTE-Uu interface. The architecture of FIG. 3 includes various MTC models described with reference to FIG. 2.

First, entities shown in FIG. 3 will be described.

In FIG. 3, an application server is a server on a network in which an MTC application is executed and may be referred to as an MTC application server. Technologies for implementing various MTC applications are applicable to an MTC application server and a detailed description thereof will be omitted. In addition, the MTC application server may access an MTC server (e.g., an SCS in FIG. 3) through a reference point API and a detailed description thereof will be omitted. Alternatively, the MTC application server may be co-located with an MTC server (e.g., an SCS).

AN MTC server (e.g., an SCS) is a server on a network for managing an MTC device and may be connected to a 3GPP network to communicate with nodes of a PLMN and a UE used for MTC.

An MTC-interworking function (IWF) may control interworking between an MTC server and an operator core network and serve as a proxy of MTC operation. In order to support an MTC indirect or hybrid model, one or more MTC-IWFs may be present in a home PLMN (HPLMN). The MTC-IWF may relay and interpret a signaling protocol on a reference point Tsp to enable a PLMN to perform a specific function. The MTC-IWF may perform a function for authenticating an MTC server, a function for authenticating a control plane request from an MTC server, various functions associated with the below-described trigger instructions, etc. before the MTC server establishes communication with a 3GPP network.

A short message service-service center (SMS-SC)/Internet protocol short message gateway (IP-SM-GW) may manage transmission and reception of an SMS. The SMS-SC serves to relay a short message between a short message entity (SME) (an entity for transmitting or receiving a short message) and a mobile station and storing and forwarding the short message. The IP-SM-GW may serve to perform protocol interworking between an IP based UE and an SMS-SC.

A charging data function (CDF)/charging gateway function (CGF) may perform a charging operation.

HLR/HSS serves to store and provide subscriber information (IMSI, etc.), routing information, configuration information, etc. to the MTC-IWF.

A mobile switching center (MSC)/SGSN/MME may perform a control function such as mobility management, authentication, resource allocation, etc. for network connection of a UE. In association with the below-described triggering, the MSC/SGSN/MME may serve to receive a trigger instruction from the MTC-IWF and process the trigger instruction into the form of a message provided to the MTC device.

A gateway GPRS support node (GGSN)/serving-gateway (S-GW)+packet data network-gateway (P-GW) may serve as a gateway for connecting a core network and an external network.

Table 2 shows main reference points of FIG. 3.

TABLE 2

| Reference point | Description |
| --- | --- |
| Tsms | Reference point used by an entity outside the 3GPP system to communicate with UEs used for MTC via SMS. |

TABLE 2-continued

| Reference point | Description |
|---|---|
| Tsp | Reference point used by an SCS to communicate with the MTC-IWF related to control plane signaling. |
| T4 | Reference point used by MTC-IWF to route device trigger to the SMS-SC in the HPLMN. |
| T5a | Reference point used between MTC-IWF and serving SGSN. |
| T5b | Reference point used between MTC-IWF and serving MME. |
| T5c | Reference point used between MTC-IWF and serving MSC. |
| S6m | Reference point used by MTC-IWF to interrrogate UE identity (HSS/HLR for E.164 mobile station international subscriber directory number (MSISDN) or external identifier mapping to IMSI) and gather UE reachability and configuration information. |
| S6n | Reference point used by MTC-AAA to interrogate HSS/HLR. |

Among T5a, T5b and T5c, one or more reference points may be referred to as T5.

In case of the indirect and hybrid model, user plane communication with an MTC server (e.g., an SCS) may be performed and, in case of the direct and hybrid model, communication with an MTC application server may be performed using a conventional protocol through Gi and SGi.

Details associated with description of FIGS. 2 to 3 may be incorporated by referring to 3GPP TS 23.682.

NAS Level Congestion Control

In general, the case in which a network exceeds a limit of a controllable communication amount may be referred to as a network congestion or overload state and operation for controlling a transmission/reception amount of a network to prevent network congestion may be referred to as network congestion control. In a 3GPP MTC network, if network congestion or overload occurs, NAS level congestion control is performed between a UE and a node (e.g., MME, SGW, PDN-GW, MSC, SGSN or GGSN) of a core network and thus signaling congestion may be avoided or controlled.

Such NAS level congestion control includes AP based congestion control and general NAS level mobility management control.

APN based congestion control refers to signaling congestion control according to a mobility management (MM)/session management (SM) protocol associated with an APN (that is, an APN associated with a congestion state) and a UE or an EPS mobility management (EMM)/EPS session management (ESM) protocol. APN based congestion control includes APN based session management congestion control and APN based mobility management congestion control.

General NAS level mobility management control means a code network node (e.g., MME, SGW, PDN-GW, MSC, SGSN or GGSN) rejects a mobility management signaling request made by a UE in a state of network congestion or overload to avoid congestion and overload.

In general, if a core network performs NAS level congestion control, a reject message provided to a UE may include a standby time (or an extended standby time) value. Such a standby time value is randomized within a predetermined range to be provided to the UE. The UE sets the received standby time value as a back-off timer value and operates so as not to request (E)MM/(E)SM signaling from a network until the back-off timer has expired.

(E)MM signaling includes, for example, an attach request, a TAU/RAU request, a service request, an extended service request, etc. In addition, (E)SM signaling includes, for example, PDN connectivity, bearer resource allocation, bearer modification, packet data protocol (PDP) context activation, PDP context modification request, etc. The back-off timer may be divided into an MM back-off timer for control of (E)MM signaling and an SM back-off timer for control of (E)SM signaling. The MM back-off timer is assigned per UE and the SM back-off timer is assigned per associated APN or per UE. These timers may independently run.

Additionally, in a 3GPP network, a terminal (e.g., an MTC device) may be configured through a NAS configuration MO to have "NAS signaling low priority". The UE configured with the NAS signaling low priority sets low priority in a NAS message (e.g., an attach request, a TAU request, a PDN connection request, etc.) and transmits the NAS message.

In general, if a core network performs NAS level congestion control, a back-off timer (or an execution standby timer) value is included in a reject message of a terminal configured with low priority (for example, if the NAS signaling low priority indicator is set such that a UE/MS is configured for NAS signaling low priority) to be transmitted. As described above, a terminal which receives a back-off timer value runs so as not to request (E)MM/(E)SM signaling from a network until a back-off timer (e.g., an MM back-off timer and/or an SM back-off timer) has expired.

Even when the back-off timer runs, an emergency service must be provided. Accordingly, if a UE/MS has already performed or starts to perform an emergency bearer service with respect to service users having a high priority, it is possible to make a request for the service even when the MM/SM back-off timer runs. Service users having a high priority may access a network with multimedia priority service access classes 11 to 15 , for example. Further, performing MT(Mobile Terminated) call/SMS services and emergency call services are cases except for applying back-off timer operations (i.e., those services may be provided even though the back-off timer is running).

Multiple Priorities

In a current 3GPP standard (Rel-10/Rel-11) MTC system environment, a UE/MS (hereinafter, referred to as a "terminal") may be configured with only one of two priorities, that is, "(NAS signaling) low priority" and "(NAS signaling) non-low priority". For example, a NAS signaling low priority indicator may be set such that a UE/MS is configured for NAS signaling low priority or a UE/MS is not configured to NAS signaling low priority.

However, a terminal may have multiple priorities of two levels or more according to future application environments. In addition, such multiple priorities may be configured per device (or per terminal) or per application level. A priority configured per UE and a priority configured per application may be separately (independently) configured. In addition, one of a plurality of priorities may be configured with respect to one application.

Since operation associated with the priority in a conventional wireless communication system is defined in consideration of only one of a "low priority" and a "non-low priority", accurate operation may not be performed if two or more priorities are configured. Accordingly, in the present invention, an operation method when multiple priorities are configured and an operation method when a priority is changed are proposed.

In order to configure different priorities per device or per application level to establish a PDN connection whenever a terminal having multiple priorities establishes a PDN connection, it is necessary to compensate for a method of establishing a PDN connection of a terminal having multiple priorities.

If a previously established PDN connection is a PDN connection having a low priority but a priority is newly changed to a different priority per device or per application level, the changed priority is applied to the newly established PDN connection. In this case, how to process a previously established PDN connection is ambiguous. For example, a PDN connection method according to priority change should be provided in order to determine whether a PDN connection having a previously configured priority is maintained or whether a PDN connection having a previously configured priority is released and a newly changed priority is applied to re-establish a PDN connection.

As described above, in a state in which an (E)MM back-off timer and an (E)SM back-off timer individually or simultaneously runs in a terminal, the terminal cannot request MM associated signaling and/or SM associated signaling from a network. However, if an emergency call/service or a multimedia priority service is used, the terminal may perform an associated procedure even when the back-off timer runs.

How a terminal having multiple priorities per terminal or per application level performs operation based on an MM back-off timer and/or an SM back-off timer (hereinafter, referred to as a "MM/SM back-off timer") if a priority is changed is ambiguous. For example, a back-off timer processing method according to priority change should be provided in order to determine whether the existing MM/SM back-off timer is stopped or maintained if a priority is changed.

For example, since how a terminal having multiple priorities processes a PDN connection according to priority change or processes a running MM/SM back-off timer according to priority change due to network congestion when the MM/SM back-off timer runs is ambiguous, PDN connection control and/or NAS level congestion control cannot be accurately or efficiently performed. In this case, network state, service connectivity and user experience are further deteriorated. Accordingly, if multiple priorities of two levels or more are applied and/or a priority is changed, there is a need for a new method of processing a PDN connection and an MM/SM back-off timer.

NAS Level Operation Improved by Applying Multipriority

As described above, it is assumed that MTC involves communication between a large number of terminals and a network and the amount of data of each terminal is relatively small and is not emergency data (e.g., report of a metering result, etc.). Accordingly, an MTC device is generally configured for a low priority.

Examples of the present invention when two-level priority (or dual priority) is applied will now be described. Here, dual priority, for example, means that an NAS signaling low priority indicator may be set to "a UE/MS is configured for NAS signaling low priority" (hereinafter, referred to as "low priority") or to "a UE/MS is not configured for NAS signaling low priority" (hereinafter, referred to as "not low priority"). However, the present invention is not restricted to dual priority and may be applied to multipriority.

A conventional session management method considering a dual priority function mainly handles a method for prohibiting SM related signaling (e.g., PDN connectivity, bearer resource allocation, bearer modification, PDP context activation, PDP context modification request, etc.) when an SM backoff is running for a specific APN.

Assume that a UE does not provide information about an APN during an attach procedure but an SM backoff timer is set because a network node rejects an NAS request of the UE. That is, the SM backoff timer is not set for a specific APN but may be set without an APN.

For example, an attach request message, on which information for requesting a PDN connection without an APN is piggybacked, may be sent (this may be expressed as "an attach request without an APN is transmitted"). When a low-priority UE transmits an attach request without an APN to a network node (e.g., MME), the network node may configure an SM backoff timer for the UE if an APN, a PDN connection with the UE of which will be established, is congested (here, the UE has made a PDN request without an APN but the network node may specify an APN for the PDN request (e.g., a default APN for the UE) based on information such as subscriber information). Here, the SM backoff timer is not configured for a specific APN but is configured without an APN. In this case, from the viewpoint of the UE, only the SM backoff timer is configured but an MM backoff timer is not configured. In this case, whether transmission of MM signaling (e.g., an attach request without an APN) is permitted depending on whether the low priority indicator is set to "low priority" or "not low priority" is not clearly defined in the related art.

More specifically, according to the related art, operation of a UE when SM signaling (e.g., a PDN connectivity request, etc.) transmitted from the UE to a network is rejected due to "insufficient resources" and thus an SM backoff timer (e.g., T3396) information element (IE) is included in a reject message is defined as follows.

When a PDN connectivity request is transmitted along with an attach request, the UE performs the following different operations according to integrity protection of an attach reject message and a received value of the SM backoff timer.

If integrity protection of the attach reject message is not provided and the SM backoff timer is running, the UE stops the SM backoff timer and then starts the SM backoff timer using an arbitrary value in a predetermined range.

If integrity protection of the attach reject message is provided, the SM backoff timer value is not 0 and is not deactivated and the SM backoff timer is running, the UE stops the SM backoff timer and then starts the SM backoff timer using a value provided by the SM backoff timer IE. When the UE does not provide information about an APN during an attach procedure, the UE is prohibited from starting a new attach procedure without an APN until the SM backoff timer has expired.

When the UE has transmitted an attach request without an APN to the network but the attach request has rejected and thus the SM backoff timer is configured for the UE, the UE may not transmit a new attach request even when an MM backoff timer is not set. In this case, whether transmission of a new attach request by a UE configured for dual priority is permitted or prohibited according to "low priority" or "not low priority" is not defined.

Overall system performance may deteriorate due to ambiguity of UE operation in terms of configuration of a backoff timer for reducing network congestion and important signaling transmission.

The embodiments of the present invention for solving this problem will now be described.

First, a method of handling low priority indication for NAS signaling will be described.

A UE may include an information element (IE) such as device properties in an NAS message and set a low priority indicator to "the UE is configured for NAS signaling low priority", thereby indicating that the UE is configured for low priority. The UE sets the low priority indicator to "not low priority" in the following cases:

the UE is performing attach for an emergency bearer service;

the UE has a PDN connection for establishment of an emergency bearer service and is performing an EPS MM procedure or is establishing a PDN connection for an emergency bearer service;

the UE configured for dual priority is requested by an upper layer to establish a PDN connection having low priority indicator set to not low priority;

the UE configured for dual priority is performing an EPS session management (SM) procedure related to the PDN connection established with the low priority indicator set to "not low priority";

the UE configured for dual priority has a PDN connection established by setting the low priority indicator to "not low priority" and is performing EPS mobility management (MM) procedure;

the UE is accessing the network with access classes 11 to 15; or the UE is responding to paging.

The network may use NAS signaling low priority indication, for NAS level MM congestion control and APN based congestion control.

When the NAS signaling low priority indication is included in a PDN connectivity request message, the MME stores the NAS signaling low priority indication in a default EPS bearer context activated by the PDN connectivity request procedure.

Next, a method of handling an SM request to a UE configured for dual priority will be described.

First, prior to operation of the UE when an SM backoff timer without an APN is configured according to the present invention, configuration of an SM backoff timer for a specific APN will be described.

If the SM backoff timer (e.g., T3396) is running for the specific APN, because a PDN connection request, bearer resource modification request or bearer resource allocation request message including a low priority indicator set to low priority was rejected due to "insufficient resources", when the SM backoff timer is configured, according to the request of the upper layer, the UE may:

send a PDN connectivity request message to the same APM, with the low priority indicator set to "not low priority"; or if a PDN connection established with the low priority indicator set to "not low priority" exists, send the bearer resource modification request or bearer resource allocation request message for this PDN connection. At this time, the low priority indicator is set to "not low priority".

According to proposals of the present invention when the SM backoff timer without an APN is configured, the UE operates as follows.

If the SM backoff timer is running without an APN, because the PDN connectivity request message transmitted along with the attach request message including the low priority indicator set to the low priority was rejected due to "insufficient resources", when the SM backoff timer is configured, the UE may initiate a new attach procedure without an APN, with the low priority indicator set to "not low priority", according to the request of the upper layer.

That is, when the SM backoff timer is configured because the PDN connectivity request transmitted along with the attach request without an APN was rejected, the new attach request message (that is, the attach request message without an APN) may not be transmitted if "low priority" is set and may be transmitted if "not low priority" is set.

When the SM backoff timer is running, transmission of the attach request without an APN, which is set to a low priority, may be prohibited to prevent network congestion from increasing and transmission of the new attach request, which is set to "not low priority", is permitted to protect emergency/important signaling, thereby clarifying UE operation and improving overall system performance. For example, it is possible to prevent unnecessary service delay/communication delay between the UE and the network and to prevent network resources from being unnecessarily wasted.

Similarly, the proposal of the present invention is applicable to an SM request related to a "PDP context activation request".

First, prior to operation of the UE when the SM backoff timer without an APN is configured, configuration of the SM backoff timer for a specific APN will be described.

If the SM backoff timer is running for the specific APN, because a PDP context activation request, secondary PDP context activation request or PDP context request modification message including a low priority indicator set to low priority was rejected due to "insufficient resources", when the SM backoff timer is configured, according to a request of an upper layer, the UE may:

send a PDP context activation request message to the same APN, with the low priority indicator set to "not low priority"; or if a PDN connection established with the low priority indicator set to "not low priority" exists, send the secondary PDP context activation request or PDP context modification request message for this PDN context. At this time, the low priority indicator is set to "not low priority".

According to the proposal of the present invention when the SM backoff timer without an APN is configured, the UE operates as follows.

If the SM backoff timer without an APN is running, because the PDP context activation request message including the low priority indicator set to the low priority was rejected due to "insufficient resources", when the SM backoff timer is configured, the UE may transmit the PDP context activation request message without an APN, with the low priority indicator set to "not low priority", according to the request of the upper layer.

That is, when the SM backoff timer is configured because the PDP context activation request without an APN was rejected, the new PDP context activation request (that is, the PDP context activation request message without an APN) may not be transmitted if "low priority" is set and may be transmitted if "not low priority" is set.

When the SM backoff timer is running, transmission of the PDP context activation request, which is set to the low priority, may be prohibited to prevent network congestion from increasing and transmission of the new PDP context activation request without an APN, which is set to "not low priority", is permitted to protect emergency/important signaling, thereby clarifying UE operation and improving overall system performance. For example, it is possible to prevent unnecessary service delay/communication delay between the UE and the network and to prevent network resources from being unnecessarily wasted.

Additionally, if the UE has multi-level priority of three levels or more, the MM backoff timer and/or the SM backoff timer may be applied according to the priority level. In the case of priority to which the MM/SM backoff time (e.g., one or more low priorities of multi-level priorities) is applied, when the PDN connectivity request message is transmitted alone, when the attach request message is transmitted along with the PDN connectivity request or when the PDP context activation request message is transmitted, congestion control is performed by the MM/SM backoff timer. For example, the NAS request may not be made while the backoff timer is running.

In the case of priority to which the MM/SM backoff timer is not applied (e.g., one or more high priorities of multi-level priorities), when the PDN connectivity request message is transmitted alone, when the attach request message is transmitted along with the PDN connectivity request or when the PDP context activation request message is transmitted, congestion control is not performed by the MM/SM backoff timer. For example, the NAS request may be made even when the backoff timer is running.

Figure 4:
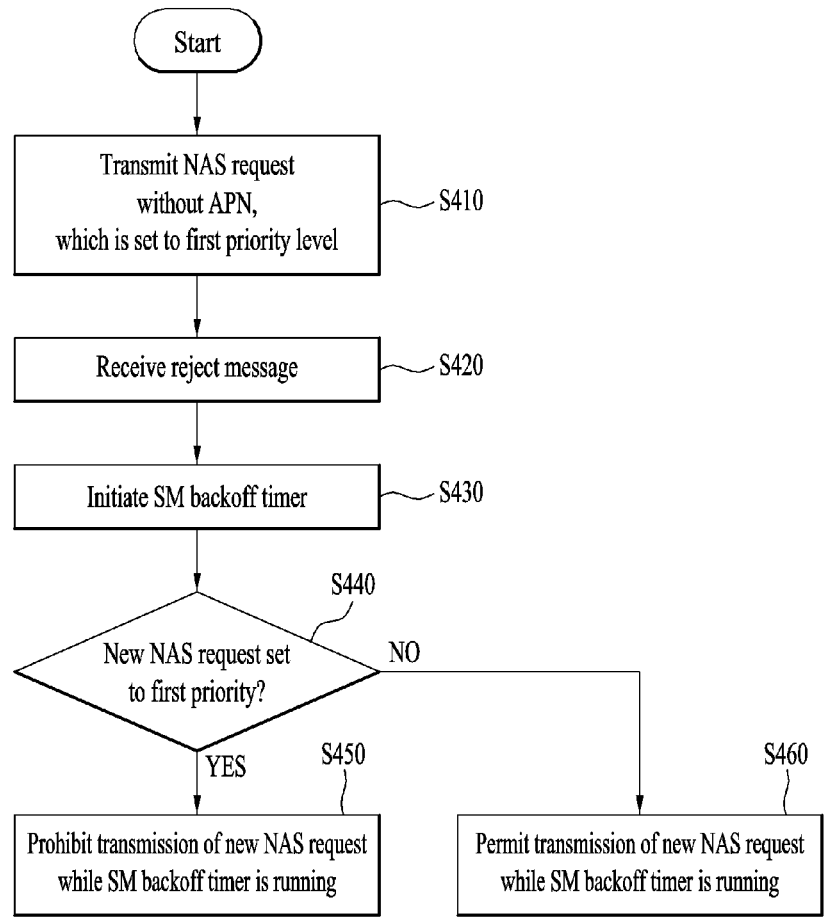
FIG. 4 is a flowchart illustrating a control method for a backoff timer according to an example of the present invention.

FIG. 4 is a flowchart illustrating a control method for a backoff timer according to an example of the present invention.

In step S410, the UE may transmit an NAS request without an APN (e.g., an attach request without an APN), which is set to a first priority level (e.g., a low priority level), to the network.

In step S420, if the network is congested (or resources are insufficient), the UE may receive a reject message for the NAS request from the network. Here, the reject message may include the SM backoff information.

In step S430, the UE may initiate the SM backoff timer.

In step S440, when the UE attempts to transmit a new NAS request (initiates a new attach procedure) while the SM backoff timer is running, whether the new NAS request is set to a first priority may be determined.

If the result of step S440 is yes (that is, the new NAS request is set to the first priority (or low priority)), the method progresses to step S450, in which the UE does not permit transmission of the new NAS request while the SM backoff timer is running.

If the result of step S440 is no (that is, the new NAS request is not set to the first priority (or low priority), the method progresses to step S460, in which the UE permits transmission of the new NAS request while the SM backoff timer is running.

In the backoff timer control method of the present invention described with reference to FIG. 4, the above-described embodiments of the present invention may be independently applied or two or more of the above-described embodiments may be simultaneously applied.

In addition, although the above-described examples of the present invention are applied to a wireless communication service of an MTC method, the principle of the present invention is equally applicable to operation according to multipriority in a general wireless communication system, control operation of a backoff timer, etc.

According to the above-described embodiments of the present invention, it is possible to prevent unnecessary delay in a service/communication between a UE and a network, to prevent network resources from being unnecessarily wasted, and to improve user experience.

Figure 5:
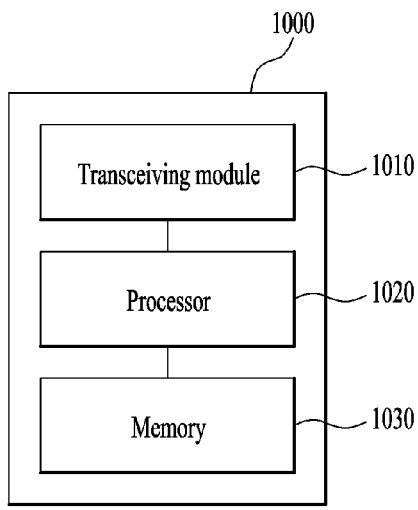
FIG. 5 is a diagram showing the configuration of a preferred embodiment of a wireless device according to an example of the present invention.

FIG. 5 is a diagram showing the configuration of a preferred embodiment of a wireless device according to an example of the present invention.

Referring to FIG. 5, the wireless device according to the present invention may include a transceiving module 1010, a processor 1020 and a memory 1030. The transceiving module 101 may be configured to transmit various signals, data and information to an external device (e.g., a network node, a terminal, a server, etc.) and receive various signals, data and information from an external device (e.g., a network node, a terminal, a server, etc.). The processor 1020 may control overall operation of the wireless device and the wireless device may be configured to perform a function for processing information transmitted or received to or from an external device. The memory 1030 may store the processed information for a predetermined time and may be replaced by a buffer (not shown).

The wireless device according to the embodiment of the present invention may be configured to control the backoff timer if multipriority is set. The processor 1020 may be configured to transmit an NAS request message without an APN (e.g., an attach request message without an APN), which is set to the first priority level (e.g., a low priority), to the network node using the transceiving module 1010. In addition, the processor 1020 may be configured to receive the reject message for the NAS request message from the network node using the transceiving module 1010. The processor 1020 may be configured to initiate the SM backoff timer based on the reject message. In addition, the processor 1020 may be configured to permit transmission of a new NAS request message which is not set to the first priority level (or is not set to a low priority) while the SM backoff timer is running. The processor 1020 may be configured to prohibit transmission of the new NAS request message which is set to the first priority level (or is set to the low priority) while the SM backoff timer is running.

The embodiments of the present invention may be independently or simultaneously applied to the detailed configuration of the wireless device and a description thereof will be omitted for clarity.

The embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

What is claimed is:

1. A method of controlling a backoff timer at a user equipment (UE) configured for multipriority, the method comprising:
   transmitting a first non access stratum (NAS) request message without an access point name (APN), which is set to a first priority level, to a network node, wherein the first NAS request message without the APN is an attach request message transmitted along with a packet data network (PDN) connectivity request without an APN;
   receiving a reject message for the first NAS request message from the network node;
   initiating a session management (SM) backoff timer based on the reject message; and
   transmitting a second NAS request message, which is not set to the first priority level, while the SM backoff timer is running.

2. The method according to claim 1, wherein the UE does not provide the APN during a procedure initiated by transmitting the first NAS request message without the APN.

3. The method according to claim 2, wherein the procedure initiated by transmitting the first NAS request message without the APN is an attach procedure.

4. The method according to claim 1, wherein the reject message includes a value for the SM backoff timer which is running while the second NAS request message is transmitted.

5. The method according to claim 1, wherein a clause in the reject message is set to insufficient resources.

6. The method according to claim 1, wherein the UE configured for multipriority is a UE configured for dual priority.

7. The method according to claim 6, wherein the first priority level corresponds to the UE being configured for NAS signaling low priority.

8. The method according to claim 6, wherein the first priority level corresponds to a low priority indicator, which is set to the UE being configured for NAS signaling low priority.

9. The method according to claim 1, wherein the UE is a machine type communication (MTC) device.

10. A user equipment (UE) device for controlling a backoff timer if multipriority is set, the UE comprising:
    a transceiver module; and
    a processor,
    wherein the processor configured to:
       transmit a first non access stratum (NAS) request message without an access point name (APN), which is set to a first priority level, to a network node using the transceiver module, wherein the first NAS request message without the APN is an attach request message transmitted along with a packet data network (PDN) connectivity request without an APN,
       receive a reject message for the first NAS request message from the network node using the transceiver module,
       initiate a session management (SM) backoff timer based on the reject message, and
       transmit a second NAS request message, which is not set to the first priority level, while the SM backoff timer is running.

* * * * *